(12) United States Patent
Petri

(10) Patent No.: US 7,970,761 B2
(45) Date of Patent: Jun. 28, 2011

(54) AUTOMATIC IDENTIFICATION OF COMPONENTS FOR A COMPOUND DOCUMENT IN A CONTENT MANAGEMENT SYSTEM

(75) Inventor: John E. Petri, Lewiston, MN (US)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 12/037,138

(22) Filed: Feb. 26, 2008

(65) Prior Publication Data
US 2008/0243880 A1 Oct. 2, 2008

Related U.S. Application Data

(63) Continuation-in-part of application No. 11/692,693, filed on Mar. 28, 2007.

(51) Int. Cl.
*G06F 7/00* (2006.01)
*G06F 17/30* (2006.01)
(52) U.S. Cl. ........ 707/728; 707/731; 707/803; 707/807; 707/808
(58) Field of Classification Search .................. 707/723, 707/727, 728, 731, 803, 807, 808, 999.001
See application file for complete search history.

(56) References Cited

U.S. PATENT DOCUMENTS

| | | | |
|---|---|---|---|
| 6,189,019 B1 * | 2/2001 | Blumer et al. | 715/205 |
| 6,356,903 B1 | 3/2002 | Baxter et al. | |
| 7,039,594 B1 | 5/2006 | Gersting | |
| 7,404,209 B2 * | 7/2008 | Shipp | 726/22 |
| 7,584,417 B2 * | 9/2009 | Friend et al. | 715/224 |
| 7,627,568 B2 * | 12/2009 | McKeeth | 1/1 |
| 7,644,361 B2 * | 1/2010 | Wu et al. | 715/273 |
| 2001/0056460 A1 | 12/2001 | Sahota et al. | |
| 2002/0059181 A1* | 5/2002 | Kohda et al. | 707/1 |
| 2004/0181543 A1* | 9/2004 | Wu et al. | 707/102 |
| 2004/0205571 A1 | 10/2004 | Adler et al. | |
| 2005/0015379 A1 | 1/2005 | Aureglia et al. | |
| 2005/0015394 A1* | 1/2005 | McKeeth | 707/100 |
| 2005/0071748 A1* | 3/2005 | Shipp | 715/501.1 |
| 2005/0091581 A1* | 4/2005 | Bezrukov et al. | 715/513 |
| 2005/0114757 A1 | 5/2005 | Sahota et al. | |

(Continued)

OTHER PUBLICATIONS

Eric Severson, "Integrating XML Publishing with a Content Management System: Best Practices", pp. 1-21, printed at http://flatirons-solutions.com/downloads/integrating_xml_publishing_with_cms.pdf on Feb. 26, 2008.

(Continued)

*Primary Examiner* — John Breene
*Assistant Examiner* — Mark E Hershley
(74) *Attorney, Agent, or Firm* — Martin & Associates, LLC; Derek P. Martin

(57) ABSTRACT

A content management system (CMS) includes a component identification mechanism for identifying components in a component-centric way that takes into account specified conditions for a link location in a compound document as well as component relationships and conditions. By using the relationships and conditions, a more intelligent choice may be made when identifying components for a particular link location. The identifying of components for a given link location in a compound document may be used by the content management system when auto-population is enabled, and may be used by the content management system to provide a list of candidate components to a user when auto-suggestion is enabled.

20 Claims, 8 Drawing Sheets

U.S. PATENT DOCUMENTS

| | | |
|---|---|---|
| 2006/0004868 A1* | 1/2006 | Claudatos et al. ......... 707/104.1 |
| 2006/0031762 A1 | 2/2006 | Takashima |
| 2006/0206866 A1* | 9/2006 | Eldrige et al. ................ 717/122 |
| 2007/0112777 A1* | 5/2007 | Field et al. ...................... 707/10 |
| 2007/0143674 A1 | 6/2007 | Daos et al. |
| 2007/0206221 A1 | 9/2007 | Wyler et al. |
| 2008/0021861 A1 | 1/2008 | Fitzsimons et al. |
| 2008/0243807 A1 | 10/2008 | Gaucas et al. |
| 2008/0243915 A1 | 10/2008 | Shah et al. |
| 2009/0157382 A1 | 6/2009 | Bar |
| 2009/0307583 A1 | 12/2009 | Tonisson |

OTHER PUBLICATIONS

Johnson, R.B. "Image Processing for Compound Documents", Institute of Electrical and Electronic Engineers (IEEE), pp. 1-8, 1995.

Al-Hawamdeh, Suliman et al. "Compound Document Processing System", Institute of Electrical and Electronic Engineers (IEEE), pp. 640-644, 1991.

Satoh, Ichiro "A Compound Document Framework for Multimedia Networking", Proceedings of the First International Conference on Distributed Frameworks fro Multimedia Applications (DFMA'05) 0-7695-2273-4/05.

* cited by examiner

| Link Location 1 | Link Location 2 | Link Location 3 | Link Location 4 |
|---|---|---|---|
| A | E | G | Z |
| D | B | F | Y |
| FIG. 12 | FIG. 13 | FIG. 14 | FIG. 15 |

AUTOMATIC IDENTIFICATION OF COMPONENTS FOR A COMPOUND DOCUMENT IN A CONTENT MANAGEMENT SYSTEM

CROSS-REFERENCE TO PARENT APPLICATION

This patent application is a continuation-in-part (CIP) of a U.S. patent application entitled "AUTONOMIC UPDATING OF TEMPLATES IN A CONTENT MANAGEMENT SYSTEM", Ser. No. 11/692,693 filed on Mar. 28, 2007, which is incorporated herein by reference.

BACKGROUND

1. Technical Field

This disclosure generally relates to content management systems, and more specifically relates to processing compound documents in a content management system.

2. Background Art

Content management systems (CMSs) have been developed and allow many users to efficiently share electronic content such as text, audio files, video files, pictures, graphics, etc. Content management systems typically control access to content in a repository. A user may generate content, and when the content is checked into the repository, the content may be subsequently processed by the CMS according to predefined rules. A user may also check out content from the repository, or link to content in the repository while generating content. The rules in a CMS assure that content that comes into or out of the system or that is linked to meets desired criteria specified in the rules.

Compound documents have become popular in content management systems. Compound documents typically include multiple links to multiple other documents (or components) in the content management system. For the disclosure and claims herein, the term "compound document" includes any document in a content management system that includes one or more links to one or more components (e.g., documents) in the repository in the content management system. One example of a compound document that is commercially available is called the Electronic Common Technical Document (eCTD). The US Food and Drug Administration (FDA) and other regulatory agencies dictate that documents submitted electronically must adhere to the eCTD standard.

Because of the importance and widespread use of compound documents, attempts have been made to improve compound document assembly in content management systems. For example, the concepts of "auto population" and "auto suggestion" are known in the art. Auto population refers to the content management system automatically determining a component in the repository that should be linked to at a particular link location in a compound document. Auto suggestion refers to the content management system providing suggestions to a user that helps the user make more intelligent decisions for which component should be linked to at a particular link location in a compound document. The use of auto suggestion can significantly reduce the time the user has to spend searching or browsing the repository for the right components to link into a compound document.

Known methods for performing auto population or auto suggestion include the use of named queries, the identification of a component for a link location based on surrounding metadata, and document-centric auto population based on link popularity. The use of named queries is very limited because named queries are typically defined in advance based on assumptions about the placement of resulting candidate document links and the type of metadata used to find those candidate documents. By predefining named queries, the content management system is then at the mercy of how well the named queries were defined, and whether those definitions meet future needs.

Identification of a component for a link location may be done by examining surrounding metadata. This is more dynamic and flexible than the named queries discussed above because it takes into account the applicability of the surrounding context in the metadata when identifying a candidate component for a given link location. For example, metadata from a parent or sibling XML component may be used to alter the identification of components to provide more dynamic suggestions. However, this approach has limitations because the surrounding context may not have enough information to run an adequate query.

Document-centric auto population based on link popularity was discussed in the parent patent application entitled "AUTONOMIC UPDATING OF TEMPLATES IN A CONTENT MANAGEMENT SYSTEM," U.S. patent application Ser. No. 11/692,693 filed on Mar. 28, 2007. A component for a link in a compound document may be identified by the system based on the individual popularity based on the amount of reuse of the component. This type of automatic identification of components does not take into account any associations or relationships between the components, or any specified conditions for reusing a component.

A problem with all three of the prior art approaches outlined above is all of these approaches are document-centric. As a result, identifying a component for a particular link location is based solely on how each individual component may fit into a particular compound document or type of compound document, without taking into consideration any relationships or conditions that may affect efficient identification of a component for a link location in a content management system. Without a way for a content management system to account for relationships between components or defined conditions in identifying a component for a particular link location in a compound document, known content management systems will not be able to perform auto-population or auto-suggest functions in an optimal way.

BRIEF SUMMARY

A content management system (CMS) includes a component identification mechanism for identifying components in a component-centric way that takes into account specified conditions for a link location in a compound document as well as component relationships and conditions. By using the relationships and conditions, a more intelligent choice may be made when identifying components for a particular link location. The identifying of components for a given link location in a compound document may be used by the content management system when auto-population is enabled, and may be used by the content management system to provide a list of candidate components to a user when auto-suggestion is enabled.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 12 shows a ranked list of components for the first link location of the compound documents shown in FIG. 9;

FIG. 13 shows a ranked list of components for the second link location of the compound documents shown in FIG. 9;

FIG. 14 shows a ranked list of components for the third link location of the compound documents shown in FIG. 9; and FIG. 15 shows a ranked list of components for the fourth link location of the compound documents shown in FIG. 9.

DETAILED DESCRIPTION

A component identification mechanism in a content management system identifies one or more components for a particular link location in a compound document based on popularity of components and based on component relationships or specified conditions. By using the relationships and conditions, a more intelligent choice may be made when identifying a component for a particular link location. An identified component may be used by an auto-population mechanism. In the alternative, one or more identified components may be used by an auto-suggest mechanism by presenting a list of the components to a user, who then selects one of the components on the list for the current link location in the compound document.

Figure 1:
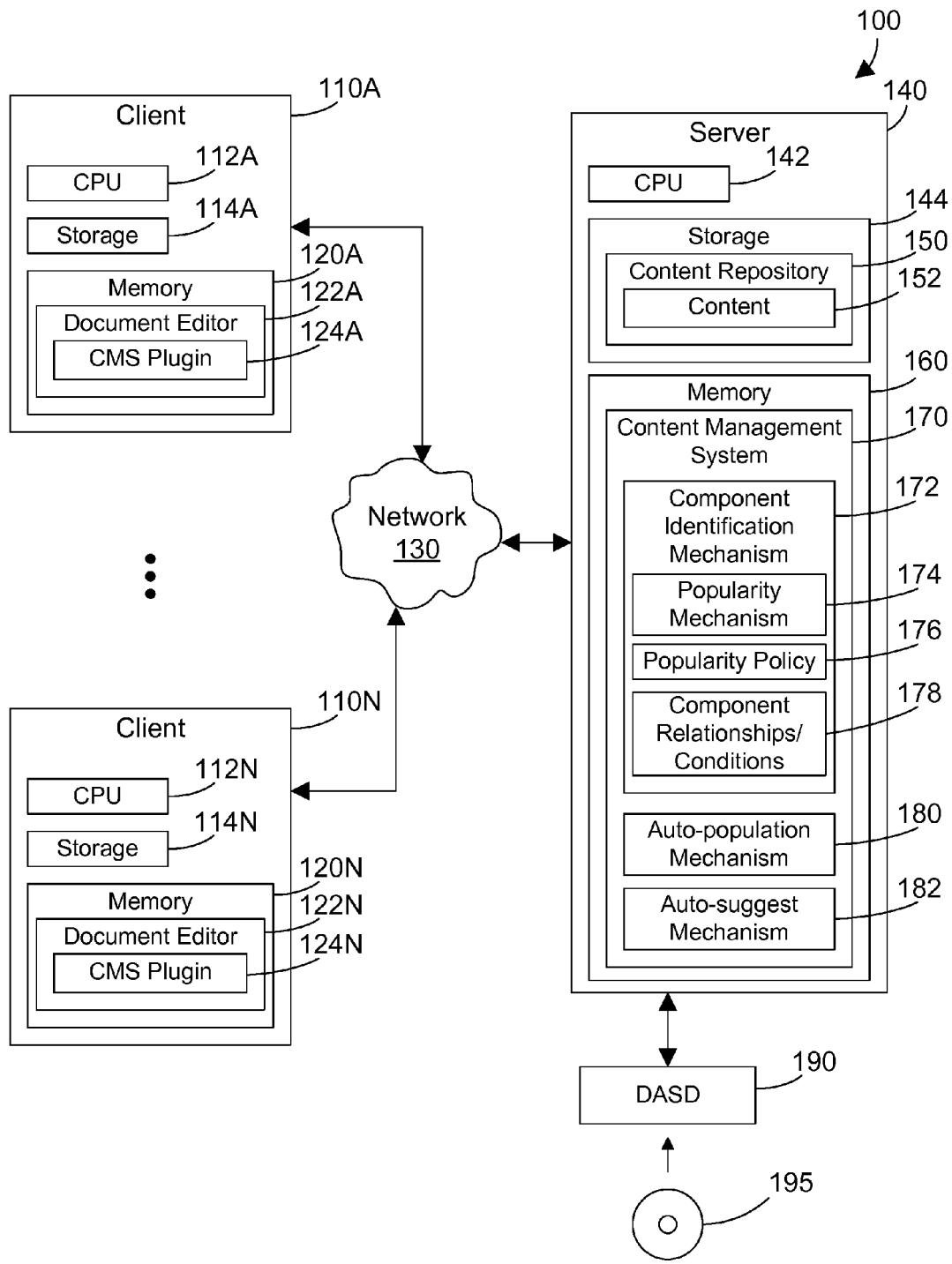
FIG. 1 is a block diagram of a networked computer system that includes a server computer system that has a content management system that includes a component identification mechanism that identifies components for a link location in a compound document.

Referring to FIG. 1, networked computer system 100 includes multiple clients, shown in FIG. 1 as clients 110A, . . . , 110N, coupled to a network 130. Each client preferably includes a CPU, storage, and memory that contains a document editor and a content management system (CMS) plugin. Thus, client 110A includes a CPU 112A, storage 114A, memory 120A, a document editor 122A in the memory 120A that is executed by the CPU 112A, and a CMS plugin 124A that allows the document editor 122A to interact with content 152 in the repository 150 that is managed by the CMS 170 in server 140. In similar fashion, other clients have similar components shown in client 110A, through client 110N, which includes a CPU 112N, storage 114N, memory 120N, a document editor 122N, and a CMS plugin 124N.

The CMS 170 resides in the main memory 160 of a server computer system 140 that also includes a CPU 142 and storage 144 that includes a content repository 150 that holds content 152 managed by the CMS 170. One example of a suitable server computer system 140 is an IBM eServer System i computer system. However, those skilled in the art will appreciate that the disclosure herein applies equally to any type of client or server computer systems, regardless of whether each computer system is a complicated multi-user computing apparatus, a single user workstation, or an embedded control system. CMS 170 includes a component identification mechanism 172 that identifies one or more components for a link location in a compound document, an auto-population mechanism 180 and an auto-suggest mechanism 182. Component identification mechanism 172 includes a popularity mechanism 174, a popularity policy 176, and component relationships/conditions 178. The popularity mechanism 174 queries the content repository 150 to determine a list of components that might be linked to at a current link location in a compound document. The components are ranked in popularity according to one or more criteria specified in the popularity policy 176, and according to component relationships/conditions 178. The component relationships/conditions 178 may include relationships between components that may be derived, for example, by examining the metadata for the components, and may also include system-specified or user-specified conditions.

Auto-population mechanism 180 receives one or more identified components from component identification mechanism 170 and selects an identified component for a particular link location in a compound document. Auto-suggestion mechanism 182 receives one or more identified components from component identification mechanism 170 and presents a list of the components to a user, who selects from the list a component for a particular link location.

In FIG. 1, repository 150 is shown separate from content management system 170. In the alternative, repository 150 could be within the content management system 170. Regardless of the location of the repository 150, the content management system 170 controls access to and manages content 152 in the repository 150.

Server computer system 140 may include other features of computer systems that are not shown in FIG. 1 but are well-known in the art. For example, server computer system 140 preferably includes a display interface, a network interface, and a mass storage interface to an external direct access storage device (DASD) 190. The display interface is used to directly connect one or more displays to server computer system 140. These displays, which may be non-intelligent (i.e., dumb) terminals or fully programmable workstations, are used to provide system administrators and users the ability to communicate with server computer system 140. Note, however, that while a display interface is provided to support communication with one or more displays, server computer system 140 does not necessarily require a display, because all needed interaction with users and other processes may occur via the network interface.

The network interface is used to connect the server computer system 140 to multiple other computer systems (e.g., 110A, . . . , 110N) via a network, such as network 130. The network interface and network 130 broadly represent any suitable way to interconnect electronic devices, regardless of whether the network 130 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The mass storage interface is used to connect mass storage devices, such as a direct access storage device 190, to server computer system 140. One specific type of direct access storage device 190 is a readable and writable CD-RW drive, which may store data to and read data from a CD-RW 195.

Main memory 160 preferably contains data and an operating system that are not shown in FIG. 1. A suitable operating system is a multitasking operating system known in the industry as i5/OS; however, those skilled in the art will appreciate that the spirit and scope of this disclosure is not limited to any one operating system. In addition, server computer system 140 utilizes well known virtual addressing mechanisms that allow the programs of server computer system 140 to behave as if they only have access to a large, single storage entity instead of access to multiple, smaller storage entities such as main memory 160, storage 144 and DASD device 190. Therefore, while data, the operating system, and content management system 170 may reside in main memory 160, those skilled in the art will recognize that these items are not necessarily all completely contained in main memory 160 at the same time. It should also be noted that the term "memory" is used herein generically to refer to the entire virtual memory of server computer system 140, and may include the virtual memory of other computer systems coupled to computer system 140.

CPU 142 may be constructed from one or more microprocessors and/or integrated circuits. CPU 142 executes program instructions stored in main memory 160. Main memory 160 stores programs and data that CPU 142 may access. When computer system 140 starts up, CPU 142 initially executes the program instructions that make up the operating system.

Although server computer system 140 is shown to contain only a single CPU, those skilled in the art will appreciate that a content management system 170 may be practiced using a computer system that has multiple CPUs. In addition, the interfaces that are included in server computer system 140 (e.g., display interface, network interface, and DASD interface) preferably each include separate, fully programmed microprocessors that are used to off-load compute-intensive processing from CPU 142. However, those skilled in the art will appreciate that these functions may be performed using I/O adapters as well.

At this point, it is important to note that while the description above is in the context of a fully functional computer system, those skilled in the art will appreciate that the content management system 170 may be distributed as an article of manufacture in a variety of forms, and the claims extend to all suitable types of computer-readable media used to actually carry out the distribution, including recordable media such as floppy disks and CD-RW (e.g., 195 of FIG. 1).

The content management system may also be delivered as part of a service engagement with a client corporation, non-profit organization, government entity, internal organizational structure, or the like. This may include configuring a computer system to perform some or all of the methods described herein, and deploying software, hardware, and web services that implement some or all of the methods described herein. This may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 2:
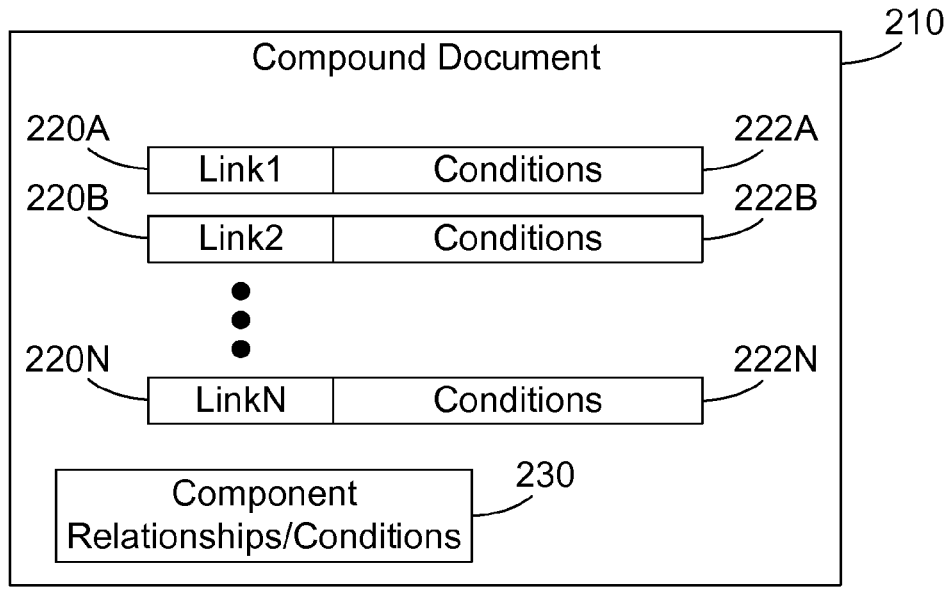
FIG. 2 is a block diagram showing details of a suitable compound document that could be stored in the repository 150 in FIG. 1.

Referring to FIG. 2, a compound document 210 is shown as one specific example of content 152 in repository 150 in FIG. 1. Compound document 210 includes multiple link locations 220, shown in FIG. 2 as 220A, 220B, . . . , 220N. When the compound document 210 is assembled, an appropriate link to a document in the repository is inserted into each corresponding link location. Link locations 220 may optionally include corresponding conditions 222 for the link that are used to determine whether a component may be linked to at the corresponding link location. Thus, as shown in FIG. 2, link 220A preferably includes conditions 222A; link 220B preferably includes conditions 222B; and link 220N preferably includes conditions 222N. In addition to specific conditions that correspond to a link as shown at 222A, 222B, . . . , 222N, the compound document 210 may also include a specification of component relationships/conditions 230 that are used to determine whether a component may be linked to at the link locations. The component relationships/conditions 230 are preferably independent of the conditions 222 corresponding to specific link locations 220. Both the conditions 222 corresponding to specific link locations 220 and the component relationships/conditions 230 are preferably included in the component relationships/conditions 178 shown in FIG. 1. The combination of conditions 222 and component relationships/conditions 230 shown in FIG. 2 allow a specific compound document to provide more detailed information that aids the content management system in identifying one or more suitable components for a given link location.

Figure 3:
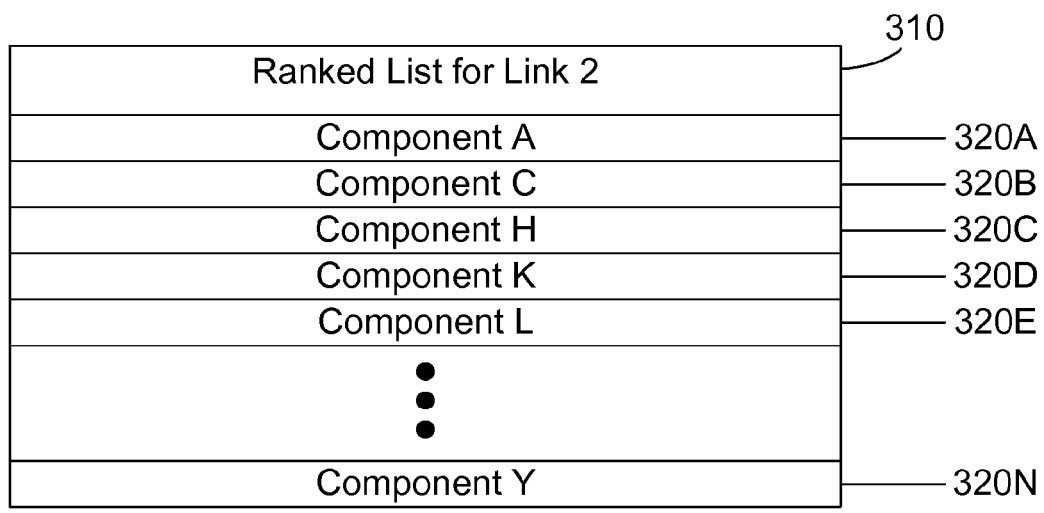
FIG. 3 is a block diagram showing a ranked list of components that are candidates that have been identified for a particular link location in a compound document.

Referring to FIG. 3, a ranked list of components for a particular link location is shown. For this specific example, ranked list 310 corresponds to the link location 220B in the compound document 210 in FIG. 2. Ranked list 310 includes a listing of possible components 320 that could be linked to at link location 220B in FIG. 1. The components shown in FIG. 3 include components 320A, 320B, 320C, 320D, 320E, . . . , 320N. Any suitable number from zero to the total number of components in the repository may be on the ranked list 310. The listed components in the ranked list 310 may be used by the auto-suggest mechanism 182 in FIG. 1 to list possible choices for a user to select. In the alternative, the listed components in the ranked list 310 may be used by the auto-population mechanism 180 in FIG. 1 to select the highest ranked component to be automatically linked to at the current link location in a compound document.

Figure 4:
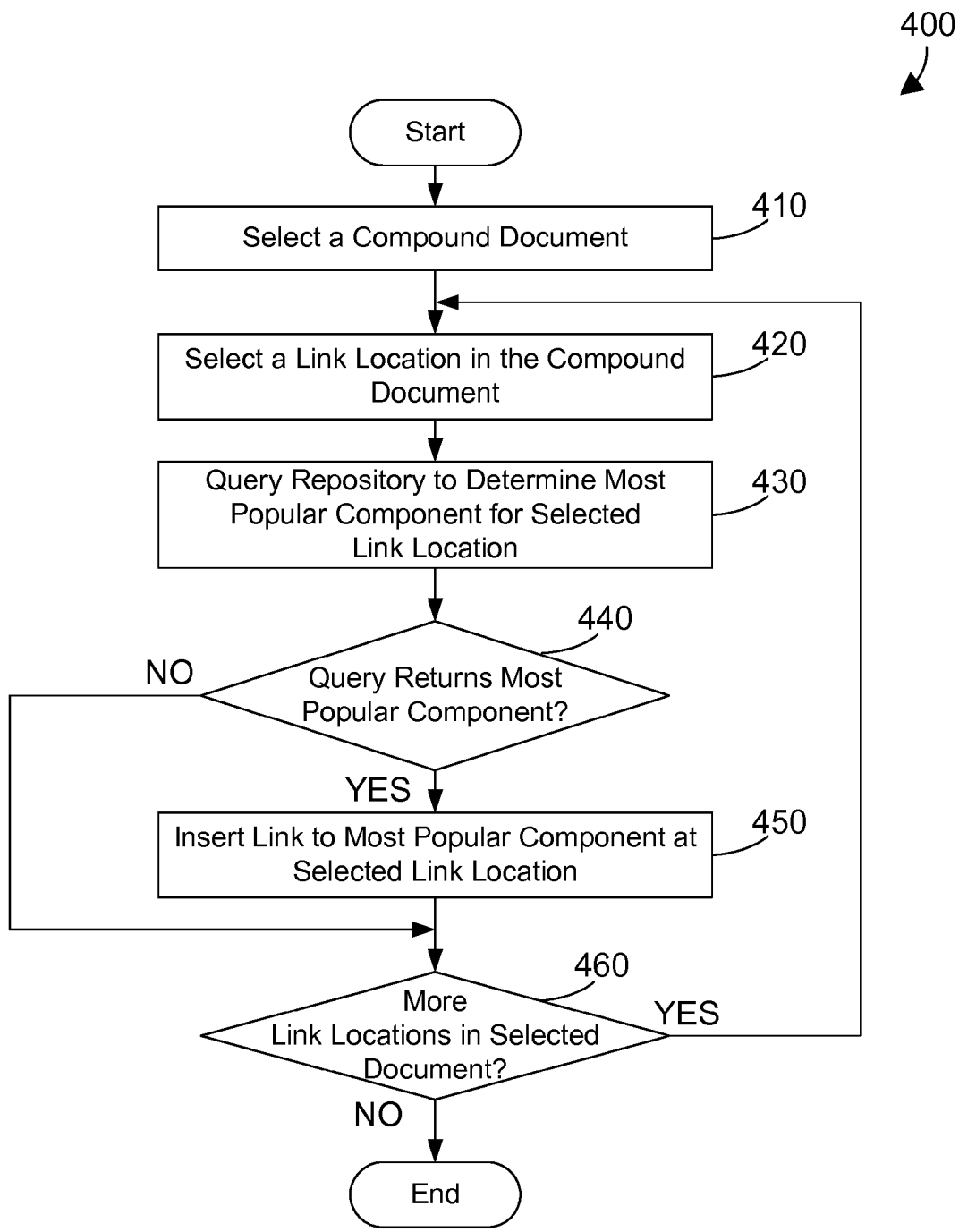
FIG. 4 is a flow diagram of a prior art method for identifying components for link locations in a compound document.

Referring to FIG. 4, a prior art method 400 shows the steps in a known auto-population mechanism. First, a compound document is selected (step 410). A link location in the compound document is then selected (step 420). The selection of the link location in step 420 may be performed, for example, when assembling the selected compound document. The repository is then queried to determine the most popular component for the selected link location (step 430). If the query does not return a most popular component (step 440=NO), method determines whether there are more link locations in the selected document to process (step 460). If not (step 460=NO), method 400 is done. If so (step 460=YES), method 400 loops back to step 420 and continues. If the query to the repository in step 430 returns a most popular component for the selected link location (step 440=YES), a link to the most popular component is inserted at the link location in the compound document (step 450). If there are no more link locations in the selected compound document to process (step 460=NO), method 400 is done. If there are more link locations in the selected compound document to process (step 460=YES), method 400 loops back to step 420 and continues.

Figure 5:
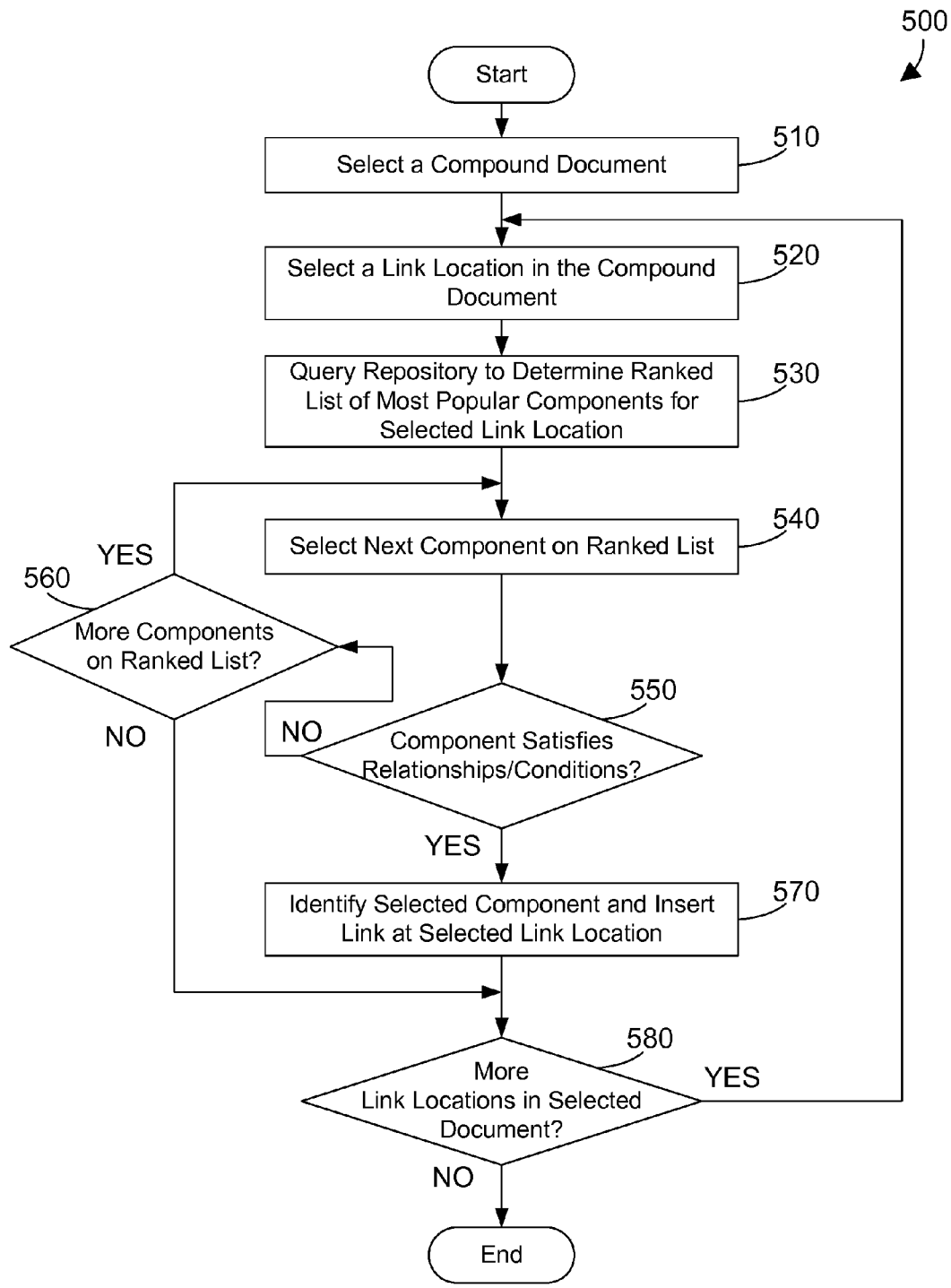
FIG. 5 is a flow diagram of a method for identifying components for link locations in a compound document in a way that accounts for specified relationships between components and conditions.

Referring to FIG. 5, method 500 is preferably performed by the component identification mechanism 172 in FIG. 1. Method 500 is presented herein as a general method for auto-population of one or more link locations in a compound document to compare and contrast how method 500 differs from prior art method 400 in FIG. 4. One skilled in the art will appreciate that other methods within the scope of the disclosure and claims herein could simply identify one or more components to link to at a given link location for either auto-population or auto-suggestion.

Method 500 begins by selecting a compound document (step 510). A link location in the compound document is selected (step 520). The repository is queried to determine a ranked list of most popular components for the selected link location (step 530). Determining which components are most popular depends on one or more criteria specified in the popularity policy 176 in FIG. 1. The first component on the ranked list is selected (step 540). If the component satisfies the relationships/conditions (e.g., 178 in FIG. 1), the selected component is identified as the appropriate component for the selected link location, and a link to the selected component is inserted at the selected link location (step 570). If there are more link locations in the selected compound document to process (step 580=YES), method 500 loops back to step 520 and continues. If there are no more link locations in the selected compound document to process (step 580=NO), method 500 is done. If the selected component does not satisfy the relationships/conditions (step 550=NO), and if there are more components on the ranked list (step 560=YES), method 500 loops back to step 540 to select the next component on the ranked list. In essence, if the component does not satisfy the relationships/conditions, the component is skipped and not used for the selected link location. If there are no more components on the ranked list (step 560=NO), method 500 goes to step 580 to determine whether there are more link locations to process in the selected compound document. If so (step 580=YES), method 500 loops back to step 520 and continues until there are no more link locations in the selected compound document to process (step 580=NO).

Figure 6:
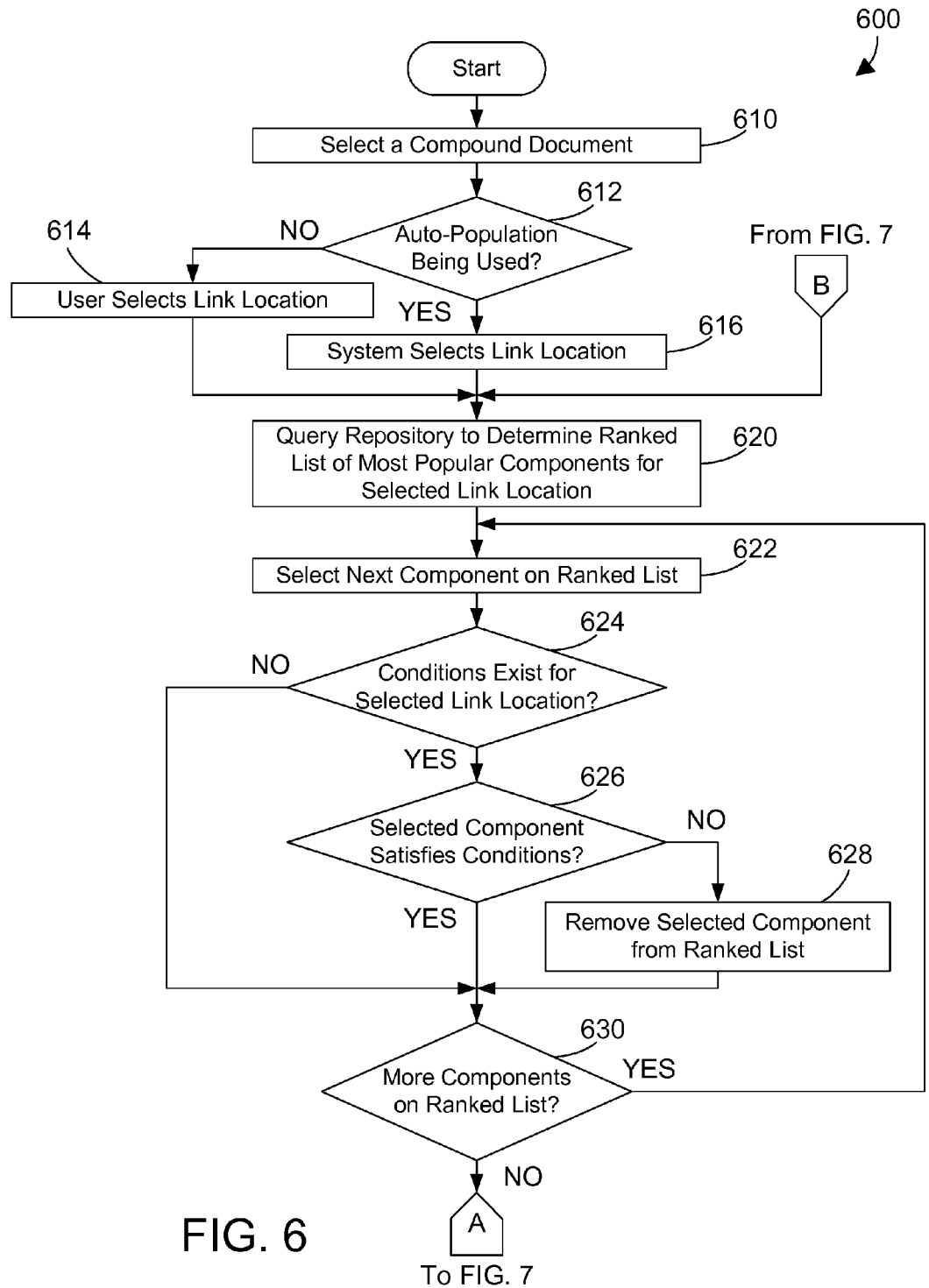
FIGS. 6 and 7 are different portions of a flow diagram of one specific sample method for identifying components for link locations in a compound document.
Figure 7:
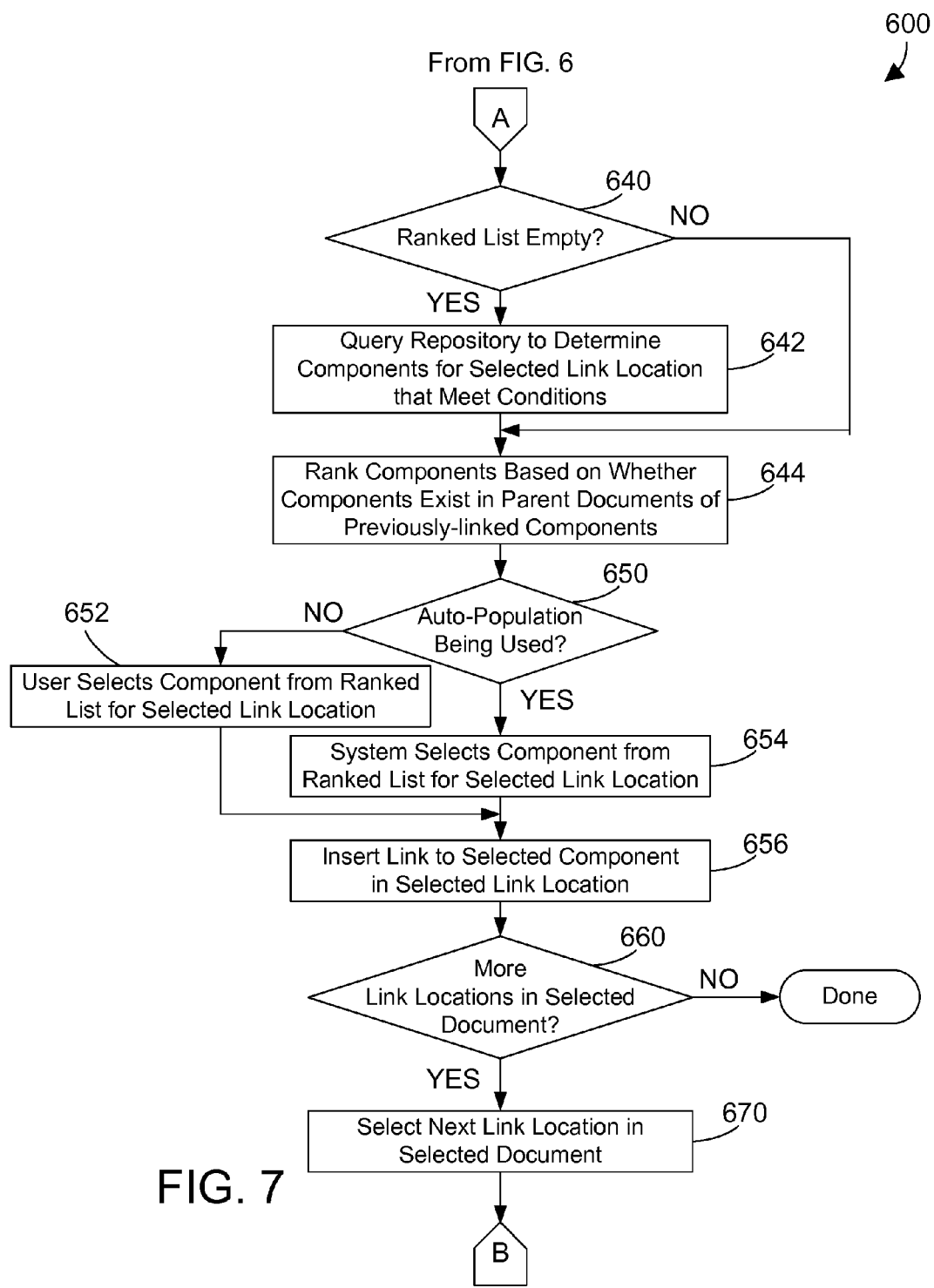

FIGS. 6 and 7 show a more detailed method 600 in accordance with the disclosure and claims herein. Method 600 begins by selecting a compound document (step 610). If auto-population is being used (step 612=YES), the component identification mechanism automatically selects a link location (step 616). If auto-population is not being used (step 612=YES), the user selects a link location (step 614). The content repository is then queried to determine a ranked list of most popular components for the selected link location (step 620). The first component on the ranked list is then selected (step 622). If conditions exist for the selected link location (step 624=YES), and if the selected component does not satisfy the conditions (step 626=NO), the selected component is removed from the ranked list (step 628). The conditions examined in step 624 may include conditions corresponding to the selected link location, such as conditions 222A for link location 220A in FIG. 2, or may be component relationship/conditions 230 that are independent from the link locations, as shown in FIG. 2. If no conditions exist for the selected link location (step 624=NO), or if the selected component satisfies the conditions (step 626=YES), method 600 proceeds to step 630. If there are more components on the ranked list (step 630=YES), method 600 loops back to step 622 and continues until all components on the ranked list have been processed, and all components on the ranked list that do not satisfy the conditions have been removed from the ranked list. Next, method 600 proceeds from marker A in FIG. 6 to marker A in FIG. 7, and processing of the ranked list begins. If the ranked list is empty (step 642=YES), the repository is queried again to determine components for the selected link location that meet the conditions for the link location (step 642). The components in the ranked list are then ranked (or re-ranked) based on whether the components exist in parent documents of previously-linked components (step 644). Whether a component exists in one or more parent documents of previously-linked components is an example of a suitable component relationship or condition that could be included in component relationships/conditions 178 in FIG. 1. If auto-population is being used (step 650=YES), the component identification mechanism automatically selects a component from the ranked list for the selected link location (step 654). If auto-population is not being used (step 650=NO), auto-suggestion is being used, so the ranked list is presented to the user, who selects a component from the ranked list for the selected link location (step 652). A link to the selected component is then inserted in the selected link location (step 656). If there are no more link locations in the selected compound document to process (step 660=NO), method 600 is done. If there are more link locations in the selected compound document to process (step 660=YES), the next link location in the selected compound document is selected (step 670), and method 600 proceeds from marker B in FIG. 7 to marker B in FIG. 6 to step 620. In this manner, all link locations in a selected compound document may be processed to identify one or more components that are suitable components for each link location based on conditions specified for the link locations and based on specified component relationship/conditions.

Figure 8:
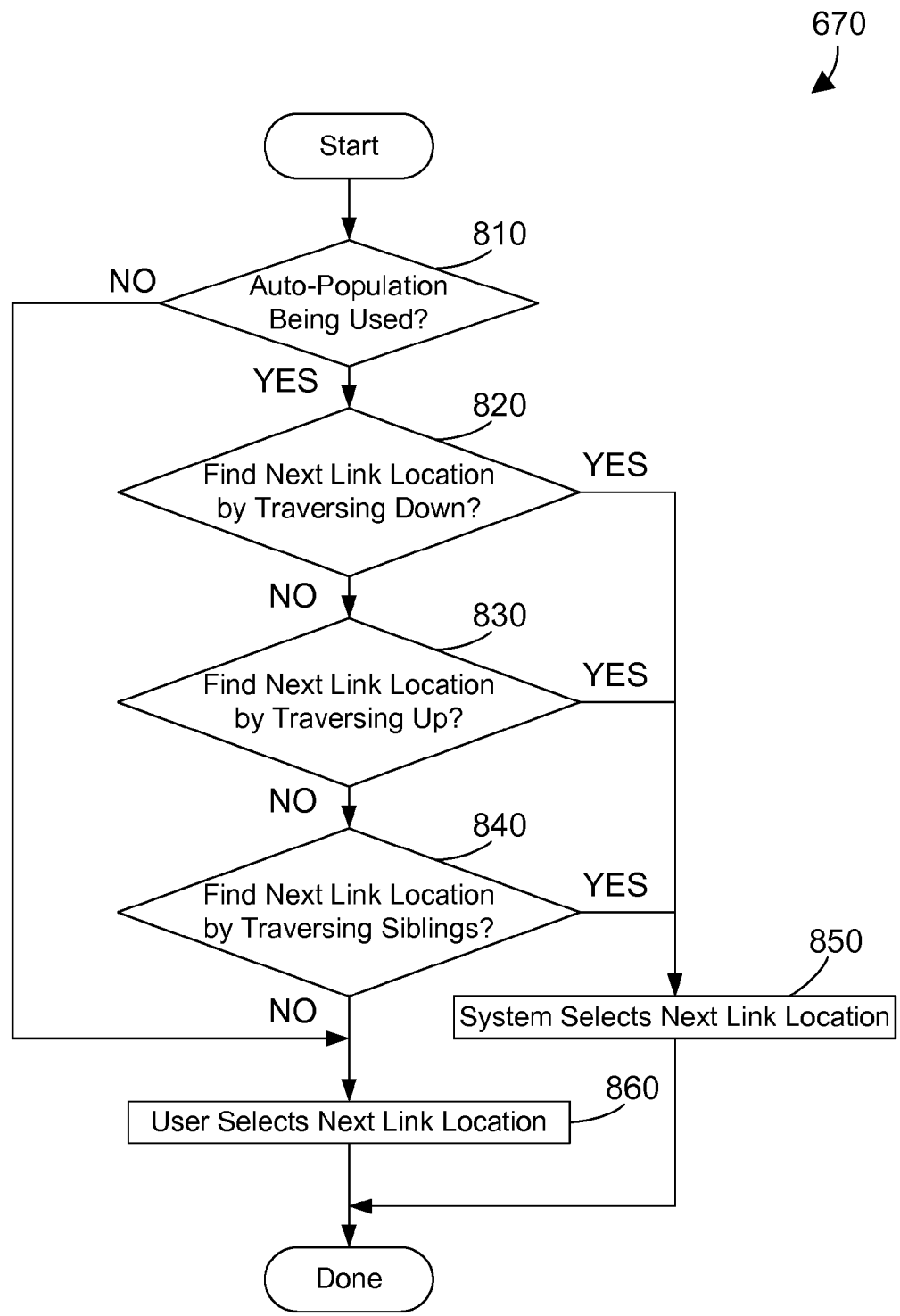
FIG. 8 is a flow diagram of one specific implementation for step 670 in FIG. 7.

Referring to FIG. 8, a method 670 is one suitable implementation for step 670 shown in FIG. 7. If auto-population is not being used (step 810=NO), the user selects the next link location (step 860). If auto-population is being used (step 810=YES), and if the next link is to be located by traversing down the compound document (step 820=YES), or if the next link location is to be located by traversing up the compound document (step 830=YES), or if the next link location is to be located by traversing siblings (step 840=YES), the component identification mechanism 172 selects the next link location (step 850). If all of steps 820, 830 and 840 are NO, the user selects the next link location (step 860).

Figure 9:
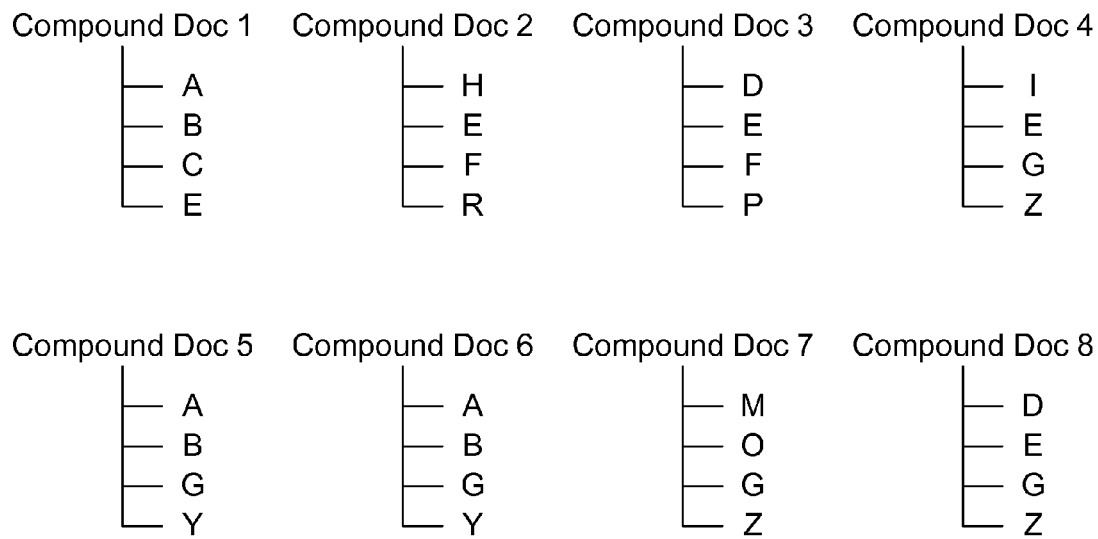
FIG. 9 is a diagram of eight compound documents in a repository in a content management system.

A simple example is now presented to illustrate the general concepts discussed above. FIG. 9 shows eight compound documents that each include four link locations, represented by the four levels in each compound document. We assume for this example the eight compound documents shown in FIG. 9 are all instances of the same compound document type. The first link location for Compound Doc 1 has a link to component A; the first link location for Compound Doc 2 has a link to component H; and so on through the first link location for Compound Doc 8, which has a link to component D. In similar fashion, second link location in each compound document includes a link to the components of the designated letters shown in FIG. 9, and so on through all the link locations in all documents shown in FIG. 9.

We now assume that auto-population is enabled, and determine how the prior art method 400 in FIG. 4 would identify components for the link locations. We assume a compound document is selected that includes four link locations as shown for each of the documents in FIG. 9 (step 410). The first link location is selected (step 420). The repository is queried, and the most popular component for the first link location is component A, which occurs in the first link location in Compound Documents 1, 5 and 6. The query returned the most popular component (step 440=YES), so a link to A is inserted in the first link location of the compound document, as shown at 1010 in FIG. 10. There are more link locations in the selected document to process (step 460=YES), so method 400 returns to step 420 and selects the next link location, the second link location in the compound document (step 420). A query is performed, and the most popular component for the second link location is E, which occurs in Compound Documents 2, 3, 4 and 8. Because the query returned the most popular component (step 440=YES), a link to E is inserted in the second link location in the compound document, as shown at 1020 in FIG. 10. There are more link locations in the selected document to process (step 460=YES), so method 400 returns to step 420, where the third link location in the compound document is selected (step 420). The repository is queried (step 430), and the most popular link in the repository for the third link location is G (step 440=YES), which occurs in Compound Documents 4, 5, 6, 7 and 8. As a result, a link to G is inserted in the third link location in the compound document, as shown at 1030 in FIG. 10. There is still one more link location in the selected document (step 460=YES), so method 400 returns to step 420, where the fourth link in the compound document is selected (step 420). The repository is queried (step 430), and the most popular component for this link location is Z (step 440=YES). As a result, a link to Z is inserted in the fourth link location of the compound document, as shown at 1040 in FIG. 10.

Figure 10:
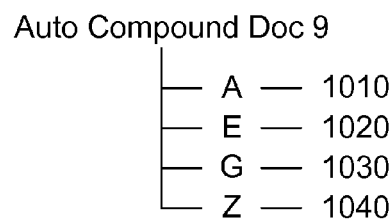
FIG. 10 is a diagram of a compound document that has its components automatically identified in accordance with prior art method 400 in FIG. 4.

The automatic identification and link creation for the link locations in the compound document shown in FIG. 10 is document-centric, meaning each link location is considered in isolation of other link locations or other considerations. For each link location, the component that is the most popular is linked in at that location. The disclosure and claims herein provide a solution that is component-centric, and can take into account relationships between components and specified conditions. For example, a brief review of the compound documents in FIG. 9 shows that whenever component A is present in the first link location, component B is present in the second link location, as shown in Compound Documents 1, 5 and 6. In addition, component E is only present in the second link location when some component other than A is present in the first link location. Of course, there could be many other relationships and conditions that could be specified or derived, and the disclosure and claims herein expressly extend to any suitable relationship between components and/or conditions that could be derived by the content management system or specified by a user.

We now consider how method 500 in FIG. 5 processes the compound documents in FIG. 9. First, the compound document template is selected (step 510). The compound document template is a starting point for creating an instance of a compound document. Each compound document in FIG. 9 is preferably an instance of a common compound document type. The first link location is selected (step 520). The repository is queried, and the most popular components for the first link location are returned in a ranked list (step 530). We assume for this example a ranked list of components includes all components that have more than one occurrence at a particular link location. Thus, the ranked list for the first link location is shown in FIG. 12. The first component on the ranked list in FIG. 12, namely component A, is selected (step 540). Because this is the first link location, we assume component A satisfies all relationships and conditions (step 550=YES). Component A is thus identified as the proper component for the first link location, and a link to component A is inserted at the first link location (step 570), as shown at 1110 in FIG. 11. There are more link locations in the selected document (step 580=YES), so method 500 returns to step 520. The second link location is then selected (step 520). The repository is queried to determine a ranked list of components for the selected link location (step 530). The ranked list for the second link location is shown in FIG. 13. Component E is selected (step 540). We assume a component relationship or condition exists that does not allow component A in the first location and component E in the second location. Because component A has already been selected in the first location, component E cannot be selected for the second location. Thus, component E does not satisfy the relationships/conditions (step 550=NO). There is another component on the ranked list (step 560=YES), so component B is selected (step 540). We assume there are no component relationships/conditions that prevent component B in the second link location when component A is in the first link location (step 550=YES). Component B is then identified as the appropriate component for the second link location, and a link to component B is inserted in the second link location (step 570), as shown at 1120 in FIG. 11.

There are more link locations in the selected compound document to process (step 580=YES), so method 500 selects the third link location in the compound document (step 520). The repository is queried to determine a ranked list of most popular components for the third link location (step 530). The ranked list for the third link location is shown in FIG. 14. Component G is selected (step 540). We assume there are no relationships or conditions that prevent G from being in the third link location (step 550=YES), so component G is identified as the appropriate component for the third link location, and a link to component G is inserted in the third link location (step 570), as shown at 1130 in FIG. 11. There is one more link location in the selected compound document to process (step 580=YES), so next the fourth link location is selected (step 520). The repository is queried to determine a ranked list of the most popular components for the selected link location (step 530). The ranked list for the fourth link location is shown in FIG. 15. Component Z is selected (step 540). While Z in the fourth link location occurs with G in the third link location in Compound Documents 4, 7 and 8, none of these documents include A in the first link location and B in the second link location. As a result, we assume component G does not satisfy the relationships/conditions (step 550=NO). There are more components on the ranked list (step 560=YES), so the next component, namely component Y, is selected (step 540). Although Y occurs in the fourth link location in one less document in FIG. 9 than Z, when Y occurs in the fourth link location, the three previous link locations are the same as those previously selected for the first three link locations, namely A, B and G, as shown in Compound Documents 5 and 6. As a result, component Y satisfies the relationships/conditions (step 550=YES), so component Y is identified as the appropriate component for the fourth link location, and a link to component Y is inserted in the fourth link location (step 570), as shown at 1140 in FIG. 11. There are no more link locations in the selected compound document to process (step 580=NO), so method 500 is done.

Figure 11:
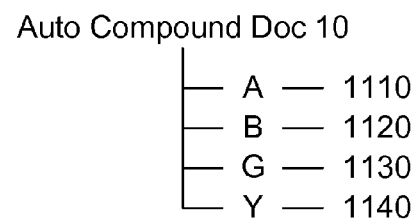
FIG. 11 is a diagram of a compound document that has its components automatically identified in accordance with method 500 in FIG. 5.

A quick review of FIGS. 10 and 11 shows the prior art method 400 produced different results in FIG. 10 than method 500 produced in FIG. 11. Because method 500 allows analyzing relationships between components and derived or specified conditions, method 500 selected component B for the second link location as shown in FIG. 11 instead of component E selected using prior art method 400 as shown in FIG. 10. Similarly, method 500 selected component Y for the fourth link location as shown in FIG. 11 instead of component Z selected using prior art method 400 as shown in FIG. 10. The results in FIG. 11 illustrate that taking relationships between components into account and by taking into account derived or user-specified conditions, a more intelligent choice of components may be made.

While the specific example in FIGS. 9-15 relates to auto-population of link locations in a compound document, one skilled in the art will recognize the same logic could be used in an auto-suggest mechanism to present the ranked lists in FIGS. 12-15 to a user, who would then select one of the components in the ranked list as the appropriate component for each link location.

The content management system disclosed and claimed herein allows automatically identifying one or more components for a link location in a compound document. The repository is queried to determine a ranked list of components that may be inserted at the current link location. The ranked list may be processed to determine whether each entry on the ranked list satisfies all component relationships and conditions. The result is more intelligent identification of components for a given link location in a compound document.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, the disclosure and claims herein expressly extend to content management systems that handle any suitable type of content, whether currently known or developed in the future.

What is claimed is:

1. An apparatus comprising:
    at least one processor;
    a memory coupled to the at least one processor;
    a repository residing in the memory that includes:
        a plurality of components;
        a compound document that includes:
            a plurality of link locations;
            first conditions corresponding to a first link location that are used to determine whether a component may be linked to at the first link location; and
            second conditions independent of the plurality of link locations that define at least one relationship between at least two of the plurality of components;
    a content management system residing in the memory and executed by the at least one processor, the content management system managing the plurality of components in the repository, the content management system comprising:
        a component identification mechanism that creates a ranked list of components for a selected link location in the compound document, where a rank of each component in the ranked list is determined according to popularity of the component in the selected link location in the plurality of components in the repository and according to the second conditions that specify a relationship between a component and a higher ranked component in the ranked list, wherein the component identification mechanism determines whether each component in the ranked list satisfies the first and second conditions, and if a component in the ranked list does not satisfy the first and second conditions, the component is not identified for the selected link location, and if the component in the ranked list satisfies the first and second conditions, the component is identified for the selected link location.

2. The apparatus of claim 1 wherein at least one of the first and second conditions comprises a user-specified condition.

3. The apparatus of claim 1 wherein at least one of the first and second conditions comprises a condition derived from metadata that specifies relationships between components in the repository.

4. The apparatus of claim 1 wherein the popularity of the component in the selected link location is determined using a popularity policy that specifies at least one criterion for determining popularity of a component for the selected link location.

5. The apparatus of claim 1 further comprising an auto-population mechanism that automatically creates in the selected link location a link to a component identified for the selected link location.

6. The apparatus of claim 1 further comprising an auto-suggest mechanism that presents identified components to a user so the user may select one of the identified components, and creates in the selected link location a link to the component selected by the user.

7. A computer-implemented method for a content management system that manages a plurality of components in a repository to process a compound document that includes a plurality of link locations, first conditions corresponding to a first link location that are used to determine whether a component may be linked to at the first link location, and second conditions independent of the plurality of link locations that define at least one relationship between at least two of the plurality of components, the method comprising the steps of:
    (A) querying the repository to determine a ranked list of most popular components for the selected link location, where a rank of each component in the ranked list is determined according to popularity of the component in the selected link location in the plurality of components in the repository and according to the second conditions that specify a relationship between the component and a higher ranked component in the ranked list;
    (B) selecting a highest ranking component on the ranked list;
    (C) determining whether the selected component on the ranked list satisfies the first and second conditions;
    (D) if the selected component satisfies the first and second conditions, identifying the selected component; and
    (E) if the selected component does not satisfy the first and second conditions, not identifying the selected component.

8. The method of claim 7 wherein if there are more components on the ranked list to process, selecting the next highest ranking component on the ranked list, and repeating steps (C) through (E).

9. The method of claim 7 wherein at least one of the first and second conditions comprises a user-specified condition.

10. The method of claim 7 wherein at least one of the first and second conditions comprises a condition derived from metadata that specifies relationships between components in the repository.

11. The method of claim 7 wherein the popularity of the component in the selected link location is determined using a popularity policy that specifies at least one criterion for determining popularity of a component for the selected link location.

12. The method of claim 7 further comprising the step of automatically creating in the selected link location a link to a component identified for the selected link location.

13. The method of claim 7 further comprising the steps of:
    presenting identified components to a user;

receiving a selection of one of the identified components; and creating in the selected link location a link to the component selected by the user.

14. A computer-implemented method for a content management system that manages a plurality of components in a repository to process a compound document that includes a plurality of link locations, first conditions corresponding to a first link location that are used to determine whether a component may be linked to at the first link location, and second conditions independent of the plurality of link locations that define at least one relationship between at least two of the plurality of components, the method comprising the steps of:

(A) a user defining at least one of the first conditions;

(B) a user defining at least one of the second conditions that includes a component that must be included in a second position in the ranked list when a previous component is in a first position in the ranked list and that includes a component that may not be included in a fourth position in the ranked list when a previous component is in a third position in the ranked list;

(C) the content management system automatically determining at least one of the first conditions based on metadata that specifies relationships between components in the repository;

(D) the content management system automatically determining at least one of the second conditions based on metadata that specifies relationships between components in the repository;

(E) selecting one of auto-population and auto-suggestion for processing the compound document;

(F) if auto-population was selected in step (E), the content management system selecting a link location in the compound document;

(G) if auto-suggestion was selected in step (E), a user selecting a link location in the compound document;

(H) querying the repository to determine a ranked list of most popular components for the selected link location, where a rank of each component in the ranked list is determined according to popularity of the component in the selected link location in the plurality of components in the repository and according to the second conditions that specify a relationship between the component and a higher ranked component in the ranked list;

(I) selecting a highest ranking component on the ranked list;

(J) determining whether the selected component on the ranked list satisfies the first and second conditions;

(K) if the selected component does not satisfy the first and second conditions, removing the selected component from the ranked list;

(L) if there are more components on the ranked list to process, repeating steps (I) through (K) until there are no more components on the ranked list to process;

(M) if the ranked list is empty, querying the repository to determine a list of components for the selected link location that satisfy the first and second conditions;

(N) ranking the components in the list determined in step (M) according to whether the components exist in at least one parent document of previously-linked components;

(O) if auto-population was selected in step (E), the content management system identifying a component from the ranked list determined in (N) for the selected link location;

(P) if auto-suggestion was selected in step (E), a user selecting a component from the ranked list determined in (N) for the selected link location;

(Q) inserting a link to the selected component in the selected link location;

(R) repeating steps (F) through (Q) for each link location in the selected document.

15. An article of manufacture comprising:

(A) a content management system that manages a plurality of documents in a repository, the content management system comprising:
 a. a compound document that includes:
  i. a plurality of link locations;
  ii. first conditions corresponding to a first link location that are used to determine whether a component may be linked to at the first link location; and
  iii. second conditions independent of the plurality of link locations that define at least one relationship between at least two of the plurality of components;
 b. a component identification mechanism that creates a ranked list of components for a selected link location in the compound document, where a rank of each component in the ranked list is determined according to popularity of the component in the selected link location in the plurality of components in the repository and according to the second conditions that specify a relationship between a component and a higher ranked component in the ranked list, wherein the component identification mechanism determines whether each component in the ranked list satisfies the first and second conditions, and if a component in the ranked list does not satisfy the first and second conditions, the component is not identified for the selected link location, and if the component in the ranked list satisfies the first and second conditions, the component is identified for the selected link location; and (B) computer-readable media bearing the content management system.

16. The article of manufacture of claim 15 wherein at least one of the first and second conditions comprises a user-specified condition.

17. The article of manufacture of claim 15 wherein at least one of the first and second conditions comprises a condition derived from metadata that specifies relationships between components in the repository.

18. The article of manufacture of claim 15 wherein the popularity of the component in the selected link location is determined using a popularity policy that specifies at least one criterion for determining popularity of a component for the selected link location.

19. The article of manufacture of claim 15 further comprising an auto-population mechanism that automatically creates in the selected link location a link to a component identified for the selected link location.

20. The article of manufacture of claim 15 further comprising an auto-suggest mechanism that presents identified components to a user so the user may select one of the identified components, and creates in the selected link location a link to the component selected by the user.

* * * * *